June 11, 1940.   B. H. PEAK   2,204,443
VALVE SPRING TOOL
Filed Oct. 6, 1938
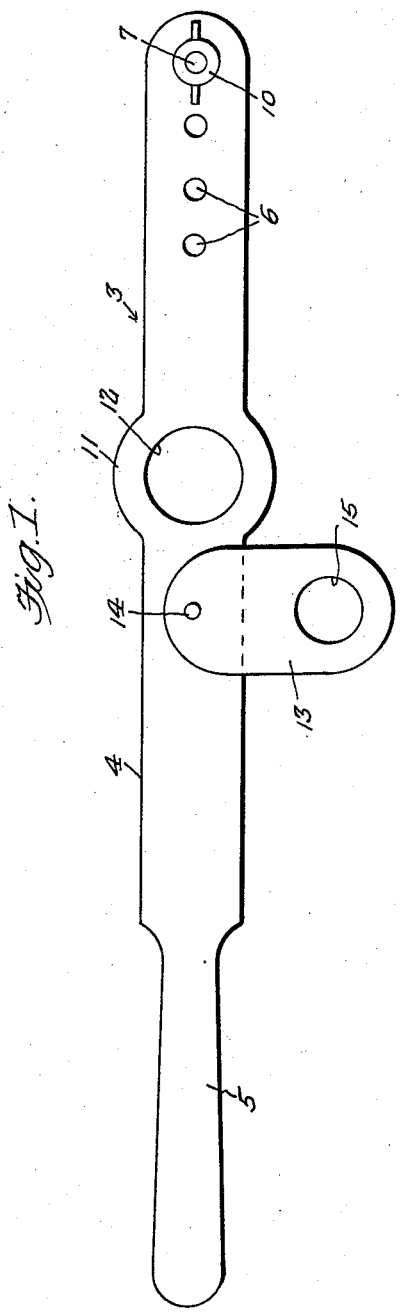
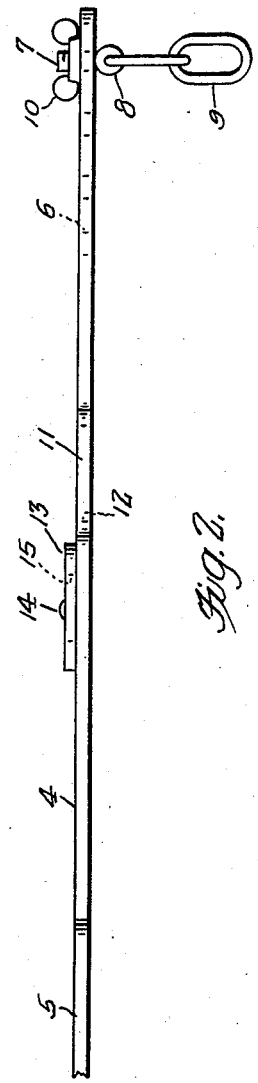
Inventor
*Ben H. Peak,*
By *Clarence A. O'Brien and Hyman Berman*
Attorneys Patented June 11, 1940

2,204,443

UNITED STATES PATENT OFFICE 2,204,443

VALVE SPRING TOOL

Ben H. Peak, Simi, Calif., assignor of one-third to Dohrman McCoy, Simi, Calif.

Application October 6, 1938, Serial No. 233,638

1 Claim. (Cl. 29—86.3)

This invention relates to an improved automotive type valve spring tool which is especially but not necessarily adapted for use by automobile mechanics, and it has reference to a readily adaptable device for use on tractors, truck motors and the like to facilitate compressing the valve spring and removing the retention pin or cotter key from so-called overhead valves.

Needless to say, I am aware that many different styles of spring lifters and compressing implements and tools have been devised for the same general purpose. It is therefore my primary aim to generally improve upon tools in this particular line of endeavor by providing one of utmost simplicity and economy, the preferred embodiment being such as to expedite handling and to efficiently and aptly fulfill the requirement of a tool of this classification.

Briefly, the preferred embodiment of the invention is characterized by a handle equipped lever, anchoring means being provided on one end and the intermediate portion being fashioned to embrace the valve stem to function as an end thrust member to compress the key and to force the cap or washer clear of the spring to permit it to be readily removed or inserted as the case may be.

Other features and advantages will become more readily apparent from the following description and drawing.

In the drawing:

Figure 1 is a top plan view of a tool constructed in accordance with the principles of this invention.

Figure 2 is an edge view of the same.

Referring to the drawing by distinguishing reference numerals, it will be observed that the lever as a unit is denoted by the numeral 3. It comprises a sturdy, flat strap or bar of metal 4, the same being here shown as longitudinally elongated in form. One end is fashioned to provide a comfortable handle or grip 5. The opposite end is provided with a series of selectively usable bolt holes 6. The bolt 7 is provided with an eye 8 to accommodate the chain links 9, while the threaded end serves to accommodate a wing nut or equivalent clamping nut 10. This provides a quick adjustable anchoring device for fastening one end of the lever on the motor block. The intermediate portion of the lever is of somewhat ringlike form as indicated at the point 11 and at this point is a circular opening or hole 12, which together with the part 11 forms a collar to embrace the valve stem (not shown) and rest against the spring cup to force it in a position to compress the spring and to uncover the cotter key to allow it to be removed or inserted as the case may be. In practice I propose to use one or more auxiliary adapter plates 13. The one shown is somewhat ovate in form and one end is pivotally anchored on the intermediate portion of the lever as at the point 14. The opposite end is provided with a smaller valve stem accommodation hole 15. This hole 15 will swing over the hole 12 so that it is possible to use either size hole, depending on the diameter of the valve rod or spring. It is also within the scope of the invention to have the adapter plate 13 detachably mounted and to use a series of adapter plates of different sized holes, depending on the work in hand. The simplicity of the invention is such as to make it quite evident how the tool is actually used in accomplishing the desired results.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A valve spring tool comprising a longitudinally elongated lever in the form of a plate flat and straight from end to end, one end of said plate being fashioned to provide a handle, the opposite end of the plate being provided with a series of selectively usable longitudinally spaced and aligned bolt holes, an anchoring unit adapted to be permanently carried by said lever and comprising a chain to be attached to the motor block, an eye bolt carried by the chain and a thumb nut for said eye bolt, said eye bolt being selectively connectable with said bolt holes, the intermediate portion of the lever being formed with a hole of a predetermined diameter for passage of a valve stem, the marginal edge portion of said hole constituting an end thrust shoulder and being adapted to engage and press against a coiled spring for compressing the latter to facilitate insertion and removal of a cotter key, and an optionally usable auxiliary spring thrust plate hingedly attached at one end to the lever at a point adjacent said valve stem hole, said auxiliary plate being adapted to swing into superimposed relation with respect to the first named plate and having on its free end an additional valve stem hole of a diameter less than said first named valve stem hole, whereby to register with the latter to provide a second spring thrust shoulder.

BEN H. PEAK.